United States Patent
Baqué et al.

(10) Patent No.: US 11,768,983 B2
(45) Date of Patent: Sep. 26, 2023

(54) SHAPE OPTIMISATION OF TECHNICAL DEVICES VIA GRADIENT DESCENT USING CONVOLUTIONAL NEURAL NETWORK PROXIES

(71) Applicant: Ecole Polytechnique Fédérale de Lausanne EPFL-TTO, Lausanne (CH)

(72) Inventors: Pierre Bruno Baqué, Divonne-les-Bains (FR); Pascal Fua, Vaux-sur-Morges (CH); Francois Fleuret, Yverdon (CH)

(73) Assignee: ECOLE POLYTECHNIQUE FEDERALE DE LAUSANNE EPFL-TTO, Lausanne (CH)

( * ) Notice: Subject to any disclaimer, the term of this patent is extended or adjusted under 35 U.S.C. 154(b) by 183 days.

(21) Appl. No.: 16/641,849

(22) PCT Filed: Feb. 5, 2018

(86) PCT No.: PCT/EP2018/052756
§ 371 (c)(1),
(2) Date: Feb. 25, 2020

(87) PCT Pub. No.: WO2019/048085
PCT Pub. Date: Mar. 14, 2019

(65) Prior Publication Data
US 2021/0157962 A1    May 27, 2021

(30) Foreign Application Priority Data

Sep. 8, 2017  (WO) .................. PCT/EP2017/072550

(51) Int. Cl.
*G06F 30/28* (2020.01)
*G06F 30/27* (2020.01)

(52) U.S. Cl.
CPC .............. *G06F 30/28* (2020.01); *G06F 30/27* (2020.01)

(58) Field of Classification Search
CPC .......... G06F 30/28; G06F 30/27; G06F 30/23; G06F 2111/10; G06F 30/17; G06F 30/15;
(Continued)

(56) References Cited

U.S. PATENT DOCUMENTS

| | | |
|---|---|---|
| 6,606,612 B1 | 8/2003 | Rai et al. |
| 7,454,321 B1 | 11/2008 | Rai |
| 2019/0050506 A1* | 2/2019 | Umetani ................ G06N 3/084 |

FOREIGN PATENT DOCUMENTS

| | | |
|---|---|---|
| CN | 103020368 A | 4/2013 |
| CN | 104612892 A | 5/2015 |

OTHER PUBLICATIONS

Emre Yilmaz and Brian German, "A Convolutional Neural Network Approach to Training Predictors for Airfoil Performance" AIAA Aviation Forum, 18th AIAA/ISSMO Multidisciplinary Analysis and Optimization Conference, pp. 1-19 (Jun. 2017) (Year: 2017).*

(Continued)

*Primary Examiner* — Steven W Crabb
(74) *Attorney, Agent, or Firm* — BakerHostetler

(57) ABSTRACT

The present invention generally relates to a method, a system and a computer program for shape optimisation of a technical device adapted to be exposed to a fluid flowing around a contour of said device with respect to its fluid dynamic parameters. In order to provide an improved method for shape optimisation of a technical device with respect to its fluid dynamic parameters which is faster, a method is provided comprising discretizing the shape of the technical device into a plurality of points along the contour of the technical device or into a surface mesh, and inputting the plurality of points or the surface mesh into a Convolu- (Continued)

Figure 1:
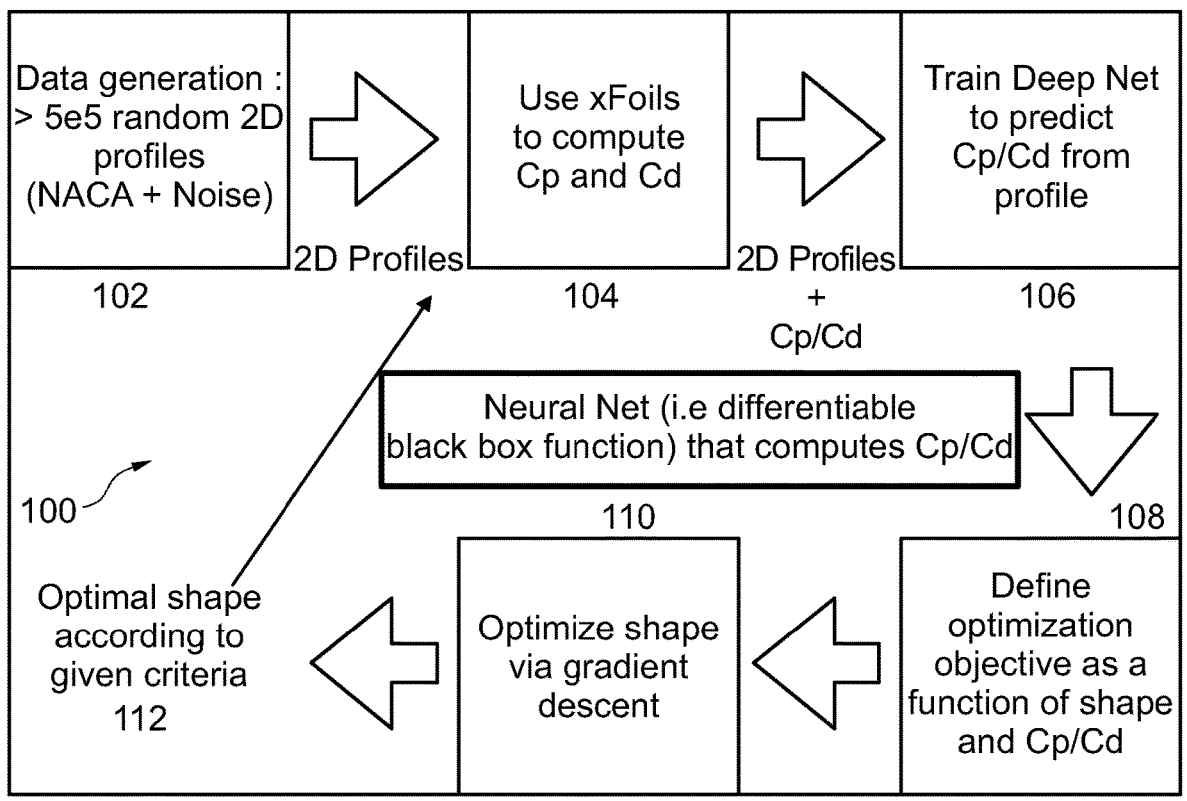

tional Neural Network (CNN) for computing a prediction of the at least one fluid dynamic parameter.

18 Claims, 4 Drawing Sheets

(58) Field of Classification Search
CPC ........ G06F 30/20; G06F 30/25; G06F 30/367; G06F 30/398; G06F 2111/00; G06F 2119/22; G06F 30/12; Y02T 90/00
See application file for complete search history.

(56) References Cited

OTHER PUBLICATIONS

Sepehr Sanaye and Arash Hassanzadeh, "Multi-objective optimization of airfoil shape for efficiency improvement and noise reduction in small wind turbines," Journal of Renewable and Sustainable Energy vol. 6 (Year: 2014).*
Jonathan Masci, et al., "Geodesic Convolutional Neural Networks on Riemannian Manifolds," 2015 IEEE International Conference on Computer Vision Workshops, p. 832-840 (Year: 2015).*
M. Secanell and A. Suleman, "Design of a Morphing Airfoil Using Aerodynamic Shape Optimization,"AIAA Journal vol. 44, No. 7, Jul. 2006 (Year: 2006).*
Daniel Stoecklein et al.; "Deep Learning for Flow Sculpting: Insights into Efficient Learning using Scientific Simulation Data"; Scientific Reports; vol. 7; No. 12; Apr. 2017; pp. 1-11.

* cited by examiner

Input:
$\mathcal{A}$ : An objective function of $Cp$ and $CD$.
$\mathcal{B}$ : A set of object boundaries defining constraints.
$\mathcal{T}$ : A training set containing couples $(\mathbf{X}, (Cp, CD))$.
Output:
$\mathcal{X}_T$ : An optimal profile.
  Initialize network weights $\omega$
  for iter < ntrainingiterations do
    Sample $(\mathbf{X}, (Cp, CD))$ uniformly from $\mathcal{T}$.
    $\omega \leftarrow \text{SGD}_\omega(\|f_\omega^p(\mathbf{X}) - Cp\|^2 + \|f_\omega^d(\mathbf{X}) - CD\|^2)$
  end for
  Initialize profile $\mathbf{X}_0$
  for $t < T$ do
    $\mathbf{X}_t \leftarrow \text{SGD}_\mathbf{X}(\mathcal{A}(f_\omega(\mathbf{X}_t), \mathbf{X}_t))$
    $\mathbf{X}_{t+1} \leftarrow Proj_\mathcal{B}(\mathbf{X}_t)$
    Sample $(\mathbf{X}_{sample}, (Cp_{sample}, CD_{sample}))$ uniformly from $\mathcal{T}$.
    $\omega \leftarrow \text{SGD}_\omega(\|f_\omega^p(\mathbf{X}_{sample}) - Cp_{sample}\|^2 + \|f_\omega^d(\mathbf{X}_{sample}) - CD_{sample}\|^2)$
    Send $\mathbf{X}_{t+1}$ to XFoil to get $(\mathbf{X}_{t+1}, (Cp(\mathbf{X}_{t+1}), CD(\mathbf{X}_{t+1})))$
    $\mathcal{T} \leftarrow \mathcal{T} \cup (\mathbf{X}_{t+1}, (Cp(\mathbf{X}_{t+1}), CD(\mathbf{X}_{t+1})))$
  end for

Fig. 3

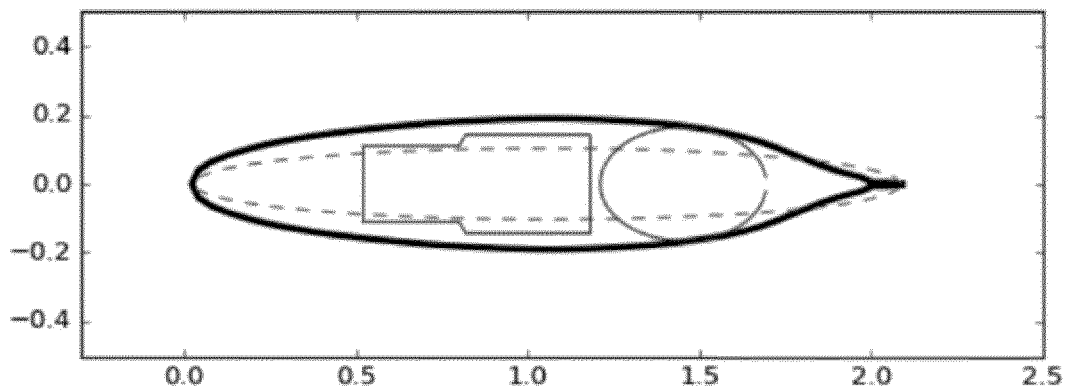

Fig. 4

SHAPE OPTIMISATION OF TECHNICAL DEVICES VIA GRADIENT DESCENT USING CONVOLUTIONAL NEURAL NETWORK PROXIES

TECHNICAL FIELD

The present invention generally relates to machine learning, and more particularly to a method, a system and a computer program for shape optimisation of a technical device adapted to be exposed to a fluid flowing around a contour of said device with respect to its fluid dynamic parameters.

THE PRIOR ART

Designing the shape of technical devices to obtain optimal desired properties is crucial for a wide range of devices. Examples include airplanes, cars, turbines, and generally any technical device adapted to be exposed to a fluid, such as air or water, flowing around its contour. Providing a shape that optimizes the fluid flow is not only important in terms of energy efficiency, but in many applications the prerequisite for the correct technical functioning of the device.

To this end, it is known to simulate the technical device to predict an optimized shape using techniques such as fluid dynamic simulation. Such mathematical simulations, however, are particularly challenging. Exemplary problems range from maximizing the L/D ratio of plane airfoils or windmill blades to minimizing the drag of undersea vessels, or the cd value of an outer shell of vehicles.

Current airfoil shape numerical optimisation methods typically rely on genetic algorithms with local search heuristics. Examples of such known methods are described in "Comparison of shape optimization techniques coupled with genetic algorithm for a wind turbine airfoil" (Orman, E; Durmus, G.—2016 IEEE Aerospace Conference). At each time step, each proposed airfoil shape has to be evaluated using Computational Fluid Dynamic (CFD) simulators. Such computations are very expensive and hence limit the efficiency of the optimisation algorithms. Furthermore, since one does not have access to the gradients of the objective with respect to the shape, many of its local deformations may have to be evaluated to find a good direction of descent.

Furthermore, to reduce the complexity of the optimisation space, such methods need parametric airfoil shapes, which are inherently restricted to stay in a low dimensional manifold inside the high dimensional space of all possible shapes. Therefore, these known methods are prohibitively inefficient and assume a low dimensional parametrisation of the shape.

CN 103 488 847 B provides an aerodynamic shape optimization method based on neural network integration. However, this approach has the drawback that it assumes a low dimensional parametrisation of the shape of the technical device to be optimised. Further, it uses a numerical analysis method based on the aerodynamic shape parameters.

CN 104 778 327 A relates to an airplane airfoil design optimization method based on artificial neural networks. However, also this approach assumes a low dimensional parametrisation of the shape of the technical device to be optimised.

It is therefore the technical problem underlying the present invention to provide techniques for optimizing the shape of a technical device with respect to its fluid dynamic parameters which are faster, more flexible and/or more accurate, thereby at least partly overcoming the above explained disadvantages of the prior art.

SUMMARY OF THE INVENTION

The invention is defined in the independent claims. Advantageous modifications of embodiments of the invention are defined in the dependent claims.

The present invention generally provides computer-implemented methods for optimizing the shape of a technical device with respect to at least one fluid dynamic parameter, the technical device being adapted to be exposed to a fluid flowing around a contour of said device. In its most generic form, the method comprises discretizing the shape of the technical device into a plurality of points along the contour of the technical device or into a surface mesh, and inputting the plurality of points or the surface mesh into a Convolutional Neural Network (CNN) for computing a prediction of the at least one fluid dynamic parameter.

Accordingly, one central difference over the known methods is the input form of the CNN, which according to the invention operates on a (preferably non-parametric) discretized shape of the (contour of the) technical device. Accordingly, the form of the input makes the input independent of the initial parametrization. This way, the process of transforming an input into a low dimensional parametrization of the input can be avoided, as instead the input is discretized along a contour of the technical device or described by a surface mesh. This makes the inventive method applicable to a wider range of shapes.

Further, this way, the inventive method can achieve a run time which is in orders of magnitude faster than algorithms of the prior art. Resulting from this speed improvement, more iterations of the optimization problem can be performed in the same amount of time and with the same hardware resources, resulting in further optimized shapes of the technical device without the need for increased processing resources. Further, technical devices can be optimized until a certain degree in shorter time and with less computing power.

Moreover, accordingly to its most the generic form of the invention, the input of the inventive method is non parametric as the method runs directly on a shape of the technical device to be optimized. Thus, any shape of a technical device may serve as input for further optimization by the inventive method, without having to parse the input prior to the optimization.

Notwithstanding the above, the inventive method leaves the CNN with more freedom to choose relevant features, which are directly linked to physical properties, such as the fluid dynamic parameters. These advantages are of the same nature as the ones often cited for CNNs in different application, such as Image Recognition. Therefore, the inventive method is more accurate. Furthermore, as will be detailed further below, it makes projected gradient descent with shape constraints very naturally implementable, which is not the case for parametric techniques.

In an aspect of the invention, the at least one fluid dynamic parameter comprises at least one of a pressure profile along the contour of the technical device (CP), a pressure drag coefficient (CDp), a friction drag coefficient (CDf) and/or a lift-to-drag ratio (L/D). This way, the fluid dynamic parameters reflect the crucial parameters for optimizing the shape of a technical device adapted to be exposed to a fluid flowing around a contour of said device, in particular airfoils.

In another aspect of the invention, the technical device comprises an airfoil, a windmill blade, a vessel and/or a vehicle. This way, the optimization techniques described herein are functionally limited to concrete technical devices in which the invention achieves its full potential.

The plurality of points may be uniformly distributed along the contour of the technical device according to another aspect of the invention. Accordingly, the discretization of the technical device is very simple yet accurate and thus provides a better input on which the optimization is to be computed, in particular with respect to two-dimensional shapes.

For three-dimensional shapes, the convolutions that are preferably used in the CNN may take the specific form of those described in the Geometric Deep Learning methods (see M. M. Bronstein, J. Bruna, Y. LeCun, A. Szlam, P. Vandergheynst, Geometric deep learning: going beyond Euclidean data, IEEE Signal Processing Magazine 2017). In particular, the method of F. Monti, D. Boscaini, J. Masci, E. Rodola, J. Svoboda, M. M. Bronstein, Geometric deep learning on graphs and manifolds using mixture model CNNs, CVPR 2017, is very well adapted. It makes the CNN more capable of using deformable meshes as input than standard methods.

According to another aspect of the invention, the method further comprises defining an optimization objective as a function of the shape of the technical device and of the at least one fluid dynamic parameter. This way, a function of the input is computed which forms the basis for further optimization. Contrary to only having a specific value as a result of optimization, the invention provides a function based on which further operations can be applied. This way, objectives for the further optimization can be derived from the function. Further, as the resulting function is preferably a differentiable function, operations such as deriving the function may be applied.

The method may further comprise optimizing the shape of the technical device using a gradient descent algorithm according to another aspect of the invention. By means of using a gradient descent algorithm, the minimum and/or maximum of the optimization objective can be computed which is tantamount to finding a step towards the optimal shape of the underlying technical device which is to be optimized.

According to another aspect of the invention, a convolution of the CNN comprises a circular convolution, in particular when operating on a two-dimensional shape. Accordingly, one can pad the extremities of an image with the corresponding symmetrized features from the other side of the image. Accordingly, information propagation may be improved and/or introducing arbitrary discontinuity in the description of the profile may be avoided.

According to yet another aspect of the invention, the CNN comprises a first branch for computing a pressure profile along the contour of the technical device (CP), wherein the first branch preferably comprises a fully-convolutional network. Further, the CNN comprises a second branch for computing a pressure and friction drag coefficient (CD), wherein the second branch preferably comprises a fully-connected network. This way, the inventive method may achieve even shorter runtimes per iteration as two separate convolutional networks are used to compute the respective parameters.

According to another aspect of the invention, the CNN comprises a common part for performing the discretizing step and/or for feeding the first and second branch. This way, the inventive method may achieve even shorter run times per iteration as the needed input for the two separate branches of the CNN is only computed once and then fed into the branches. Furthermore, having a common CNN part that performs the discretizing step before feeding the CP and CD sub-branches, improves the performance of both tasks compared to if they were treated separately. The common part of the CNN may also perform additional processing steps, such as extracting learned features which may then be further used by the first and second branch.

The inventive method may further comprise applying at least one constraint to the plurality of points or the surface mesh. This way, shapes that are within the optimization space but which are not sensible for the technical device in the real world can be avoided already during the optimization process. This also helps avoiding overfitting of the technical device to be optimized.

According to an aspect of the invention, the at least one constraint forces at least one point of the plurality of points to remain at a predefined location. This way, unnecessary optimization steps can be avoided, such as when the technical device to be optimized would only be moved as a whole along an axis without being tilted.

According to an aspect of the invention, the at least one constraint comprises a zone that stays inside of the shape of the technical device, wherein the zone preferably comprises at least one of a rectangle, parallelepiped, ellipsoid and/or an ellipsis. This way, shapes that are within the optimization space but which are not sensible for the technical device in the real world can be avoided already during the optimization process. This also helps to let the optimiser define natural constraints such as an object shape that needs to be contained inside the shell or robustness constraints.

According to another aspect of the invention, the constraint comprises a regularity measure of the shape of the technical device. This way, the smoothness of the technical device to be optimized may be maintained. This also helps to let the optimiser define natural constraints such as an object shape that needs to be contained inside the shell or robustness constraints.

According to yet another aspect of the invention, the constraint comprises a variance measure of an inter-coordinate distance of the shape of the technical device. This way, the smoothness of the technical device to be optimized may be maintained. Also this way, this helps to let the optimiser define natural constraints such as an object shape that needs to be contained inside the shell or robustness constraints.

The inventive method may further comprise generating a plurality of discretizations of National Advisory Committee for Aeronautics (NACA) profiles, using a computational fluid dynamic (CFD) simulator for computing the at least one fluid dynamic parameter based on the generated discretizations, and training the CNN with the generated discretizations and the at least one computed fluid dynamic parameter. Accordingly, the CNN can be trained such that it yields particularly accurate prediction of the at least one fluid dynamic parameter.

According to an aspect of the invention, generating the discretizations comprises adding noise to the NACA profiles. This way, small deviations from the standardized NACA profiles can be taken also into account for the training of the CNN, resulting a further improved accuracy of the predictions of the CNN.

According to another aspect of the invention, the discretized shape or the surface mesh representing the technical device is passed to a computational fluid dynamic (CFD)

simulator for generating new training data for the CNN. This way, the computed prediction calculated on the input can be verified by a CFD simulator.

According to yet another aspect of the invention, the CNN is trained during the optimization. Accordingly, the CNN is further improved during the optimization process, resulting a particularly accurate estimations of the CNN, which in turn results in optimally designed technical devices.

Further, the invention also provides systems for optimizing the shape of a technical device adapted to be exposed to a fluid flowing around a contour of said device with respect to at least one fluid dynamic parameter as explained above. Also, a computer program comprising instructions for implementing the method is also provided. Lastly, a non-transitory computer-readable medium comprising code, that when executed, causes a system to perform a method as explained above is provided.

SHORT DESCRIPTION OF THE DRAWINGS

Figure 2:
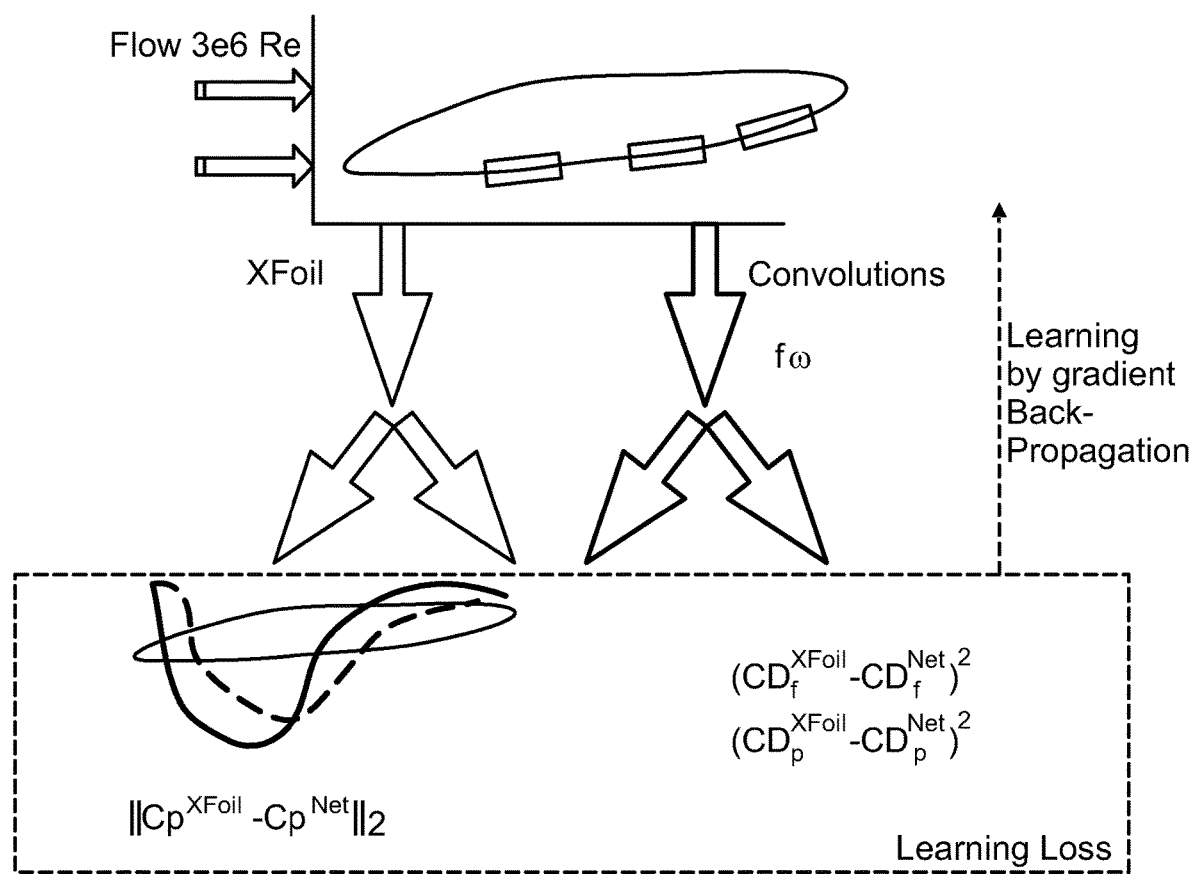
Figure 5:
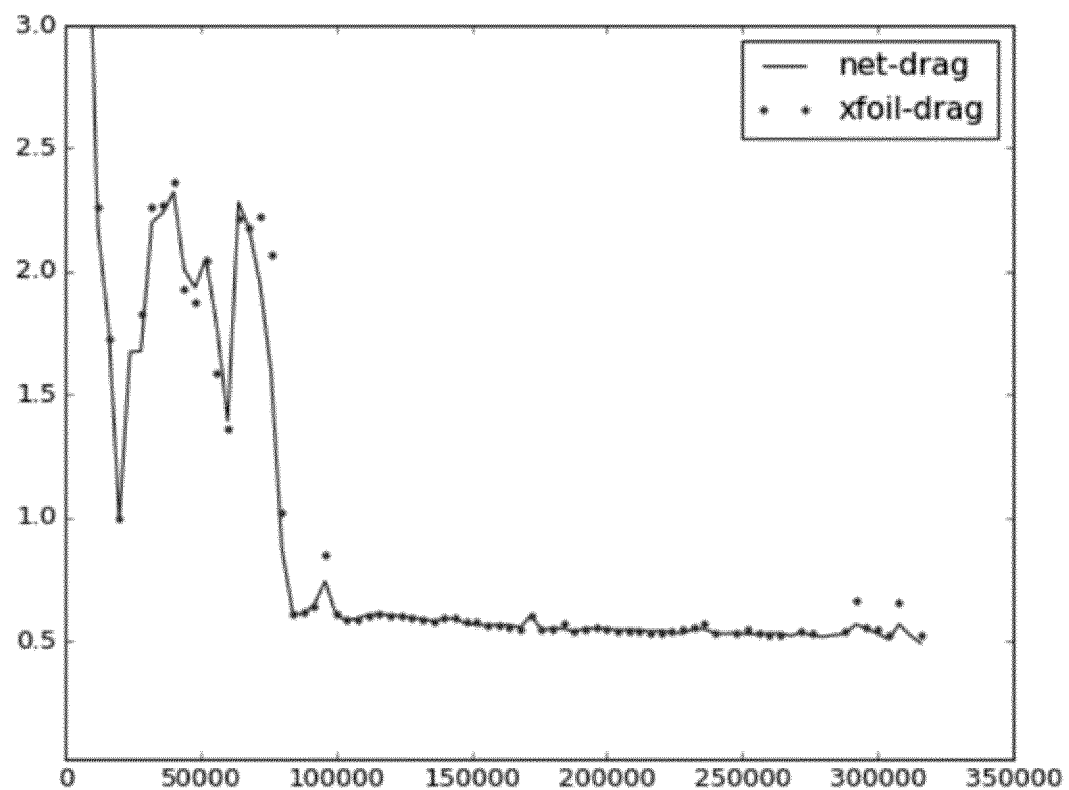

In the following detailed description, presently preferred embodiments of the invention are further described with reference to the following figures:

FIG. 1: A flow chart of a method according to an embodiment of the invention;

FIG. 2: A schematic representation of a learning pipeline according to an embodiment of the invention;

FIG. 3: An algorithm for training and shape optimisation in pseudo code according to an embodiment of the invention;

FIG. 4: An optimal arbitrary two-dimensional shape containing constraints according to an embodiment of the invention;

FIG. 5: A diagram depicting the evolution of the drag computed by a computational fluid dynamic simulator system in comparison to a Convolutional Neural Network according to an embodiment of the invention.

DETAILED DESCRIPTION OF PREFERRED EMBODIMENTS

In the following, presently preferred embodiments of the invention are described with respect to a method for shape optimisation of a technical device adapted to be exposed to a fluid flowing around a contour of said device with respect to at least one fluid dynamic parameter. The technical device may be any device the shape of which should be optimized with respect to its fluid dynamics, such as without limitation, an airplane airfoil, a windmill blade, a car chassis, a turbine, or the like. In the following description, the example of a plane's airfoil shape will be used, but it is emphasized that the concepts of the invention are not limited to this exemplary application.

FIG. 1 illustrates an exemplary flow chart of a method 100 according to an embodiment of the invention based on Convolutional Neural Network (CNN) proxies, wherein this example operates on a two-dimensional representation of an airfoil. It should be understood that embodiments of the invention may use all or only a subset of the steps of the illustrated method, and that certain steps may be performed in a different order as applicable.

First, a CNN is trained to predict the polars (the dimensionless pressure coefficient Cp and drag coefficient Cd) from a non parametric discretized shape comprising steps 102, 104 and 106. In step 102 a data basis is generated for the training of the CNN. This data may comprise any number of National Advisory Committee for Aeronautics (NACA) two-dimensional profiles. Further, noise may be added to these NACA profiles to achieve an even larger data basis, such as 50,000 (5e5 in FIG. 1), for the training in step 102. In step 104, based on the profiles of step 102, fluid dynamic parameters, such as Cp and Cd are calculated using a Computational Fluid Dynamic (CFD) simulator, such as xFoils. In step 106, the network is trained based on the prior results of steps 102 and 104 to predict the fluid dynamic parameter Cp and Cd from the profiles.

Once trained, the CNN may be used as a differentiable proxy function which predicts the polars of any arbitrary shape and to optimize the shape of the technical device via gradient descent. In step 108, an optimization objective may be defined as a function of the shape of the technical device and based on Cp and Cd. In step 110, the shape of the technical device is optimized using a gradient descent algorithm (or any of its variants) to achieve an optimal shape according to a given criteria in step 112.

By keeping the CNN parameters fixed, a projected gradient descent optimisation may be used to optimize the predicted performance with respect to the variable input shape.

Further, the CNN may be trained further during the optimisation process, using new samples around the currently explored shapes to obtain better accuracy.

Importantly, the method does not require any arbitrary parametrization of the input, while gaining the ability to optimize it with gradient based methods and keeping the computational cost low.

Input

The description of the wing profile (or any other technical device to be optimized) that is input to the CNN is of importance for the present invention. In preferred embodiments, a given arbitrary shape is discretized using a predefined number of two-dimensional points chosen uniformly along the contour of the technical device.

Although, the uniformity of the points along the contour of the technical device are not necessary for the definition of the invention, doing so has been found making the CNN execute faster and/or more accurate.

Do More precisely, let $X \in (R^2)^N$ denote a 2D tensor of dimensions N×2, where N represents a fixed number of points sampled around the wing profile with constant spacing. $x_{n,0}$ is the x-axis coordinate of the n-th point, where we assume that the fluid far away from the profile is moving along the x-axis. Xn,1 is the y-axis coordinate.

Architecture

FIG. 2 illustrates a schematic representation of a learning pipeline according to an embodiment of the invention.

A Convolutional Neural Network is used which operates on $X \in (R^2)^N$ and outputs the dimensionless pressure profile along the wing (CP) and the pressure and friction drag coefficients (CDp and CDf). More formally, a function may be defined $$f_\omega : (R^2)^N \to R^N \times R2 \quad (1)$$

$$f_\omega(X) = (Cp; CD) \quad (2)$$

where ω represents the net's parameters. The Network architecture $f_\omega$ is composed of a common part $f_\omega^0$ that processes the input and feeds two separate branches $f_\omega^p$ and $f_\omega^d$ which respectively predict Cp and CD.

The convolutional part is computed along the contour of the shape. Therefore, the size of the tensor along the first axis remains constant, N. The last dimension containing features, starts from size two (X,Y) coordinates and is increased to obtain an arbitrarily chosen number of features.

Standard convolutions may use zero-padding in order to maintain the number of feature points after each step. Instead, the inventive method may use a new type of convolutions called circular convolution, which are directly defined on a circle. In other terms, the extremities of the image may be padded with the corresponding symmetrized features from the other side of the image. This helps propagation of the information and may avoid introducing an arbitrary discontinuity in the description of the profile. Only as an example, a vector which is (1,2,3,4) is assumed. Resulting therefrom a vector being (3,4,1,2,3,4,1,2) would be generated before doing the convolutions thereon.

In the explained embodiment, the top part of the Network, $f_\omega^0$ uses several convolutional blocks with pass-through residual connections. Atrous convolutions may be used in order to increase the receptive field of convolutions without increasing unnecessarily the number of parameters nor reducing the resolution of the input. This produces $f_\omega^0(X)$, a feature map of size $(R^k)^N$, where k is the number of features at each vertex along the profile. Atrous convolutions are a standard technique used in semantic segmentation where convolutions are done by skipping some values (leaving holes=trous). This allows for increasing the receptive field of the convolutions while keeping the same number of convolutions. This way, information can flow faster and farther through the contour with the same number of operations.

Another Fully-Convolutional Network $f_\omega p$ may be used to produce $Cp \in R^N$ from $f_\omega^0(X)$, wherein Fully-Convolutional is the same is Convolutional. Fully-Convolutional, as well as Convolutional networks, do not have a fully connected layer at the end. A Fully-Connected one, $f_\omega^d$, may be used to predict $CD \in R^2$. Fully-Connected networks are the ones which do not use convolutional layers. Therefore, they are standard networks. Fully-Connected networks have more discriminative power than Convolutional ones but need to have a fixed-size vector as input.

It should be appreciated that embodiments of the invention may also use other variants of CNNs, e.g. without residual connections of atrous convolutions.

Training

The network may be trained using the sum of two standard L2-losses for Cp and CD. In order to make training more robust to outliers, one may also use the sum of clipped L2-losses and L1-losses.

At training time, batch normalisation with exponential rolling average, dropout and weight decay L2 regularization may be further used.

The ADAM optimizer, an algorithm for first-order gradient-based optimization of stochastic objective functions, based on adaptive estimates of lower-order moments (see https://arxiv.org/abs/1412.6980) with decreasing learning rate and default meta-parameters may be used as the $SGD_\omega$ operation in FIG. 3, see further below.

Shape Optimisation

Due to the chosen parametrization of the input to the CNN, a gradient descent on the profile shape can easily be performed to achieve a desired objective.

Lift-to-Drag Ratio Once the CNN is sufficiently trained, the parameters co may be "freezed" and, for a given foil profile $X, f_\omega(X)$ may be used as an approximation of the True polars. The goal is to find the shape X which achieves maximal Lift-to-Drag ratio L/D.

Given a pair $(Cp; CD) \in R^N \times R^2$ and a profile X (needed to compute the resulting Lift), a function $A((Cp; CD), X)$ may be defined that outputs the Lift-to-Drag ratio. Therefore, we seek $$\operatorname{argmax} A(f_\omega(X), X) \quad (3)$$

$$X \in (R^2)^N$$

Since that the functions A and $f_\omega$ are fully differentiable, gradient descent—as well as any of its variants—may be used to optimize the objective.

Regularisation and Constraints

In practice, not every shape in $(R^2)^N$ would lead to a valid wing profile. Therefore, one may restrict the optimisation to a sub-domain of $(R^2)^N$ by implementing one or more of the following constraints:

Forcing at least one point of the profile to remain at a predefined location (e.g. (0,1)).

Adding a zone that should stay inside the profile.

The sucking side of the profile needs to be below the pressure side.

These constraints may be enforced during optimisation by using projected gradient. B will denote a set of constraints and ProjB the projection operation onto it as depicted in FIG. 3, see further below.

Finally, one may need to impose a small regularity constraint to maintain the smoothness of the profile. Therefore, one may add to the objective an L2-penalty constraint on the curvature of the profile. The objective becomes $$\operatorname{argmax} A(f_\omega(X), X) - \lambda_1 \|C(X)\|_2^2 - \lambda_2 \|S(X)\|_2^2, \quad (4)$$

$$X \in (R^2)^N$$

where C(X) denotes the curvature vector (or second order derivative at every point) and S(X) denotes the variance of inter-points distance.

Optimizer

FIG. 3 illustrates an algorithm for training and shape optimisation denoted in pseudo code according to an embodiment of the invention.

The pseudo code of FIG. 3 corresponds to steps 106, 108, and 110 of FIG. 1. First, a supervised training of the neural network is carried out using the ADAM optimizer to minimize the prediction loss for the ntrainingiterations-many iterations. Then, simultaneous shape optimization and online refinement of the neural network training for T-many iterations is performed. At each iteration, re-sampling of datapoints from small deformations of the current profile is carried out, which are added to the training set. Further, at every step, the profile is projected back to the feasible domain using ProjB. ProjB may be simply described as an orthogonal projection onto the surface which is very easy to implement for square and ellipsis.

In FIG. 3 the ADAM optimizer is used to keep minimizing the prediction loss and to minimize the aerodynamic objective function $A(f_\omega(Xt), Xt))$.

Use Cases

In this section, it is demonstrated how the inventive method may be used to minimize the drag of a two-dimensional shape which contains a pre-defined fixed volume as exemplary constraints. This could be for instance the horizontal profile for a high speed bicycle with a shell as depicted in FIG. 4. FIG. 4 illustrates an optimal arbitrary two-dimensional shape containing constraints according to an embodiment of the invention. The shape may have arbitrary dimensions but has to be outside of the thin line of FIG. 4.

Problem Specification and Implementation

A composite objective function that is tried to be minimized may be defined as $$D(X)_\omega + \lambda 1 \|C(X)\|2 + \lambda 2 \|S(X)\|2,$$

where $D(X)_\omega$ is the drag estimated by the Network, and the other terms are as explained above.

In this implementation, $$C(X) = d^2_x(X)^2 + d^2_y(X)^2,$$

may be implemented as follows using the TensorFlow deep learning library:

curvature=((2*X_opt[:,1:-1,1)-X_opt(:,0:-2,1)-X_opt
[:,2:,1])**2+(2*[X_opt[:,1:-1,0]-X_opt[:,0:-2,
0)-X_opt(:,2:,0])**2)

Similarly, $$S(X) = d_x(X)^2 + d_y(X)^2 - (d_x(X)^2 + d_y(X)^2),$$

may be implemented as follows:

av_interpoint_distance_sq=tf.reduce mean((X_opt(:,
0:-1,1)-X_opt[:,1:,1])**2+X_opt[:,0:-1,0]-
X_opt(:,1:,0])**2,axis=1,keep_dims=True)

distpoints=self·dist_factor*(tf.reduce_sum(((X_opt[:,
0:-1,1]-X_opt[:,1:,1])**2+(X_opt[:,0:-1,0]-
X_opt[:,1:,0])**2 av_inter_point_distance_sq)**2,axis=1)+10*((X_opt
[:,-1,1]-X_opt[:,0,1])**2+(X_opt[:,-1,0]-X_opt
[:,0,0])2-av_inter_point_distance_sq[:,0])2)

In the specific embodiment presented herein, $\lambda 1 = 10^2$ and $\lambda 2 = 10^7$.

Constraints

In this specific example, the shape is constrained to stay outside of a pre-defined volume. Projected gradient descent is used to enforce the constraints. After each gradient step, every point that violates the constraints is projected to the closest boundary point.

Ellipsis and/or rectangles may be used to describe the boundary, which makes the projection operation ProjB very fast.

Initialization

The profile is initialized as represented with the dashed line in FIG. 4 using an ellipsis whose large axis is 10 times the size of the small one.

Data

NACA shapes are standard parametric shapes for 2D shape designs not only for airfoils or the like. They were actually used in the first versions of the bicycle design by industrials. However, this section refers again to NACA shapes being used for airfoil design. The training data is in this example composed of 10,000 randomly generated 2D shapes, using a script. To these shapes, 2,000 NACA-4 digits airfoils with randomly chosen parameters are added. For each shape, 10 different angles of attack between −15 deg and +15 deg are used.

Furthermore, during optimisation, one may resample profiles randomly from small deformations around the current best shape and pass these sample to a computational fluid dynamic simulator, such as XFoil. The results may then be fed back to XFoil as new training data.

One may use the CFD software XFoil in order to compute the polars of each shape for a Reynolds number $Re = 3.10^6$ and discard the profiles for which convergence has not happened after 1200 iterations.

Implementation Details

The Neural Net architecture and optimisation algorithms may be implemented using the TensorFlow DL library.

The learning may be performed using the ADAM optimizer with the default $lr=10^{-3}$. The shape optimisation gradient descent scheme also may use ADAM with $lr=10^{-4}$. One may perform 10,000 learning steps before starting the optimization (ntrainingiterations=10,000 in FIG. 3).

Optimisation Results 320,000 iterations of gradient descent have been run to obtain the thick profile line in FIG. 4.

Efficiency of the Optimization

Once trained, the optimisation algorithm can run more than 200 steps per second on more than 100 profiles in parallel on a single GPU, which makes it particularly efficient.

FIG. 5 illustrates a diagram depicting the evolution of the drag being computed by a computational fluid dynamic simulator system in comparison to a Convolutional Neural Network according to an embodiment of the invention. As can be derived from FIG. 5, the estimations provided by the CNN are very accurate. Further, it can be derived from FIG. 5 that the drag decreases fast at the beginning and then converges to an optimal value.

Remarks

The optimal profile that obtained using the method provided herein is very different from the classical NACA type of profiles which are obtained by parametric optimization.

Application to Three-Dimensional Representations of the Technical Device

One difference with respect to the two-dimensional representation of the technical device described above may be in the type of CNN used, which will be described in the following. When using a three-dimensional representation of the technical device, the input is preferably a surface mesh. The surface mesh may define a sequence of vertices and the adjacency matrix describing edges linking them.

Input

The description of the technical device to be optimized that is input to the CNN is of importance for the present invention. In preferred embodiments, for 3D, the input is a surface mesh description, preferably in the form of a sequence of vertices and edges linking them.

More precisely, let $X \in (R^3)^N$ denote a 3D tensor of dimensions N×3, where N represents a fixed number of points sampled around the wing profile with constant spacing. $x_{n,0}$ is the x-axis coordinate of the n-th point, where we assume that the fluid far away from the profile is moving along the x-axis. Xn,1 is the y-axis coordinate and Xn,2 is the y-axis coordinate. We also input the adjacency matrix A, which describes the edges connecting the N points.

Architecture

A Geometric Convolutional Neural Network (M. M. Bronstein, J. Bruna, Y. LeCun, A. Szlam, P. Vandergheynst, Geometric deep learning: going beyond Euclidean data, IEEE Signal Processing Magazine 2017) may be used which operates on $X \in (R^3)^N$ and the adjacency matrix A and outputs the dimensionless pressure profile along the wing (CP) and the pressure and friction drag coefficients (CDp and CDf). More formally, a function may be defined $$f_\omega : (R^3)^N \to R^N \times R^3 \qquad (1)$$

$$f_\omega(X) = (Cp; CD) \qquad (2)$$

where $\omega$ represents the net's parameters. The Network architecture $f_\omega$ is composed of a common part $f_\omega^0$ that processes the input and feeds two separate branches $f_\omega^p$ and $f_\omega^d$ which respectively predict Cp and CD.

The convolutional part is preferably computed directly on the mesh representing the shape. Therefore, the size of the tensor along the first axis remains constant, N. The last dimension containing features, starts from size three (X,Y,Z) coordinates and may be increased to obtain an arbitrarily chosen number of features.

In the explained embodiment, the top part of the Network, $f_\omega^0$ uses several convolutional blocks with pass-through residual connections. Atrous convolutions may be used in order to increase the receptive field of convolutions without increasing unnecessarily the number of parameters nor reducing the resolution of the input. This produces $f_\omega^0(X)$, a feature map of size $(R^k)^N$, where k is the number of features at each vertex along the profile. Atrous convolutions are a standard technique used in semantic segmentation where convolutions are done by skipping some values (leaving holes=trous). This allows for increasing the receptive field of the convolutions while keeping the same number of convolutions. This way, information can flow faster and farther through the contour with the same number of operations.

Another Fully-Convolutional Network $f_\omega p$ may be used to produce $Cp \in R^N$ from $f_\omega^0(X)$, wherein Fully-Convolutional is the same is Convolutional. Fully-Convolutional, as well as Convolutional networks, do not have a fully connected layer at the end. An "average pooling" operation, followed by a Fully-Connected Neural Network, $f_\omega^d$, may be used to predict $CD \in R^3$. Fully-Connected networks are the ones which do not use convolutional layers. Therefore, they are standard networks. Fully-Connected networks have more discriminative power than Convolutional ones but need to have a fixed-size vector as input.

It should be appreciated that embodiments of the invention may also use other variants of CNNs, e.g. without residual connections of atrous convolutions, or other types of Geometric Convolutional Neural networks.

The optimization method and/or other implementation details in the three-dimensional case are preferably similar to the ones described above with respect to the two-dimensional case.

Comparison to Known Techniques

As mentioned before, a classical way to perform shape optimisation is via evolutionary algorithms, see "Comparison of shape optimization techniques coupled with genetic algorithm for a wind turbine airfoil" (Orman, E; Durmus, G.—2016 IEEE Aerospace Conference) for a review of such techniques.

Other earlier works use Neural Nets to predict the performance of airfoil shapes (see S. Gholizadeh and S. Seyedpoor. "Shape optimization of arch dams by metaheuristics and neural networks for frequency constraints". Scientia Iranica, 18(5):1020-1027, 2011; A. Lundberg, P. Hamlin, D. Shankar, A. Broniewicz, T. Walker, and C. Landstrm. "Automated aerodynamic vehicle shape optimization using neural networks and evolutionary optimization". SAE Int. J. Passeng. Cars—Mech. Syst., 8:242-251, 04 2015; R. J. Preen and L. Bull. "Toward the coevolution of novel vertical-axis wind turbines". IEEE Transactions on Evolutionary Computation, 2:284-293, 2015; J. Liu, W.-P. Song, Z.-H. Han, and Y. Zhang. "Efficient aerodynamic shape optimization of transonic wings using a parallel infilling strategy and surrogate models". Struct Multidisc Optim, 55:925-943, 2017). However, all of these works use a low dimensional parametrisation of the shape, whereas preferred embodiments of the present invention are based on convolutions which are ran directly on a meshing of the profile. Moreover, the networks according to these approaches are only used as a proxy which makes iterations inside an evolutionary algorithm faster. As opposed to these, preferred embodiments of the present invention directly back-propagate the gradients through the Network to optimize the objective via gradient descent.

A related work using a gradient-based optimization method is K. S. Song, S. O. Kang, S. Jun, H. Park, J. D. Kee, and K. H. Kim. "Aero-dynamic design optimisation of rear body shapes of a sedan for drag reduction". International Journal of Automotive Technology, 13:905-914, 2012. However, this work uses a very constrained parametric description of the optimisation space.

The invention claimed is:

1. A computer-implemented method for optimizing the shape of a technical device adapted to be exposed to a fluid flowing around a contour of said device with respect to at least one fluid dynamic parameter, comprising:
   discretizing the shape of the technical device into a three-dimensional surface mesh;
   inputting the three-dimensional surface mesh into a Geometric Convolutional Neural Network (CNN) to determine a prediction of the at least one fluid dynamic parameter, wherein the Geometric CNN comprises:
      a first branch for computing a pressure profile along the contour of the technical device (CP), and
      a second branch for computing a pressure and friction drag coefficient (CD);
   defining an optimization objective as a function of the shape of the technical device and of the determined at least one fluid dynamic parameter; and
   optimizing, based on the optimization objective, the shape of the technical device to achieve an optimal shape.

2. The method of claim 1, wherein the at least one fluid dynamic parameter comprises at least one of: a pressure profile along the contour of the technical device (CP), pressure drag coefficient (CDp), friction drag coefficient (CDf) and/or lift-to-drag ratio (L/D).

3. The method of claim 1, wherein the technical device comprises an airfoil, a windmill blade, a vessel and/or a vehicle.

4. The method of claim 1, wherein the three-dimensional surface mesh comprises a plurality of points uniformly distributed along the contour of the technical device.

5. The method of claim 1, wherein optimizing the shape of the technical device to achieve the optimal shape comprises optimizing the shape of the technical device using a gradient descent algorithm.

6. The method of claim 1, wherein a convolution of the Geometric CNN comprises a circular convolution.

7. The method of claim 1, wherein the Geometric CNN comprises a common part for performing the discretizing step and/or for feeding the first and second branch.

8. The method of claim 1, further comprising applying at least one constraint to the three-dimensional surface mesh.

9. The method of claim 8, wherein the at least one constraint forces at least one point of the three-dimensional surface mesh to remain at a predefined location.

10. The method of claim 8, wherein the at least one constraint comprises a zone that stays inside of the shape of the technical device, wherein the zone comprises at least one of a rectangle, parallelepiped, ellipsoid and/or an ellipsis.

11. The method of claim 8, wherein the at least one constraint comprises at least one of a regularity measure of the shape of the technical device or a variance measure of an inter-coordinate distance of the shape of the technical device.

12. The method of claim 8, further comprising:
   generating a plurality of discretizations of National Advisory Committee for Aeronautics (NACA) profiles;

using a computational fluid dynamic (CFD) simulator for computing the at least one fluid dynamic parameter based on the generated discretizations; and
training the Geometric CNN with the generated discretizations and the at least one computed fluid dynamic parameter.

13. The method of claim 12, wherein generating the discretizations comprises adding noise to the NACA profiles.

14. The method of claim 1, wherein the discretized shape or the three-dimensional surface mesh representing the technical device is passed to a computational fluid dynamic (CFD) simulator for generating training data for the Geometric CNN.

15. The method of claim 1, wherein the Geometric CNN is trained during optimization.

16. The method of claim 1, wherein the three-dimensional surface mesh comprises at least one of a plurality of vertices and at least one edge between the vertices or an adjacency matrix describing the at least one edge.

17. A system for optimizing the shape of a technical device adapted to be exposed to a fluid flowing around a contour of said device with respect to at least one fluid dynamic parameter, comprising:
    means for discretizing the shape of the technical device into a three-dimensional surface mesh;
    means for using a Geometric Convolutional Neural Network (CNN) to determine a prediction of the at least one fluid dynamic parameter based on the three-dimensional surface mesh, wherein the Geometric CNN comprises:
        a first branch for computing a pressure profile along the contour of the technical device (CP), and
        a second branch for computing a pressure and friction drag coefficient (CD);
    means for defining an optimization objective as a function of the shape of the technical device and of the determined at least one fluid dynamic parameter; and
    means for optimizing, based on the optimization function, the shape of the technical device to achieve an optimal shape.

18. A system for optimizing the shape of a technical device adapted to be exposed to a fluid flowing around a contour of said device with respect to at least one fluid dynamic parameter, comprising:
    a processor configured for:
        discretizing the shape of the technical device into a three-dimensional surface mesh;
        inputting the three-dimensional surface mesh into a Geometric Convolutional Neural Network (CNN) to determine a prediction of the at least one fluid dynamic parameter, wherein the Geometric CNN comprises:
            a first branch for computing a pressure profile along the contour of the technical device (CP), and
            a second branch for computing a pressure and friction drag coefficient (CD);
        defining an optimization objective as a function of the shape of the technical device and of the determined at least one fluid dynamic parameter; and
        optimizing, based on the optimization objective, the shape of the technical device to achieve an optimal shape.

* * * * *